United States Patent [19]
Erhardt

[11] Patent Number: 5,369,357
[45] Date of Patent: Nov. 29, 1994

[54] CCD IMAGER WITH TEST STRUCTURE

[75] Inventor: Herbert J. Erhardt, Rochester, N.Y.

[73] Assignee: Eastman Kodak Company, Rochester, N.Y.

[21] Appl. No.: 902,148

[22] Filed: Jun. 18, 1992

[51] Int. Cl.$^5$ ............................................. G01R 31/26
[52] U.S. Cl. .................................. 324/158.1; 324/767
[58] Field of Search ............. 324/158 R, 73.1, 158 D, 324/71.3; 358/213.17, 213.18, 213.19, 213.31; 257/48, 40; 382/8

[56] References Cited

U.S. PATENT DOCUMENTS

| | | | |
|---|---|---|---|
| 4,196,389 | 4/1980 | Kelly et al. | 324/158 R |
| 4,511,838 | 4/1985 | Reichman et al. | 324/71.5 |
| 4,605,849 | 8/1986 | Kliem et al. | 250/216 |
| 4,641,963 | 2/1987 | Levine | 356/124.5 |
| 4,942,357 | 7/1990 | Chang | 324/158 R |
| 5,034,903 | 7/1991 | Alfano et al. | 364/569 |
| 5,066,994 | 11/1991 | Erhadt | 357/24 |
| 5,114,237 | 5/1992 | Cazaux | 358/213.31 |

OTHER PUBLICATIONS

M. F. Tompsett, "Surface Potential Equilibration Method of Setting Charge in Charge-Coupled Devices", *IEEE Transactions on Electron Devices*, vol. ED-22, No. 6, Jun. 1975, pp. 305–309.

S. P. Emmons et al., "A Low–Noise CCD Input With Reduced Sensitivity to Threshold Voltage", *Technical Digest of IEDM*, Washington, D.C., Dec. 1974, pp. 233–235.

*Primary Examiner*—Vinh Nguyen
*Attorney, Agent, or Firm*—Rayond L. Owens

[57] ABSTRACT

The present disclosure is directed to an optically operated test structure for a CCD imager for testing for certain components of the imager modulation transfer function. The CCD imager includes a line of imaging photodetectors and a CCD shift register extending along the line of imaging photodetectors. A separate exposure drain region is adjacent each imaging photodetector and an exposure control gate extends between the imaging photodetectors and their respective exposure drain regions. A plurality of test photodetectors are in the line of the imaging photodetectors with at least one imaging photodetector being at each end of the test photodetectors. Each of the test photodetectors has an exposure drain region adjacent thereto, and a test exposure control gate extends between the test photodetectors and their respective exposure drain regions. The test exposure control gate is separate from the exposure control gate for the imaging photodetectors.

11 Claims, 1 Drawing Sheet

CCD IMAGER WITH TEST STRUCTURE

FIELD OF THE INVENTION

The present invention relates to a charge-coupled device (CCD) imager having a built in test structure, and, more particularly, to a CCD imager having a test structure which utilizes optical introduction of a test signal which is independent of device threshold shifts, making it useful in a manufacturing environment where robust test techniques are required.

BACKGROUND OF THE INVENTION

The ultimate performance characteristic of a CCD imager is its modulation transfer function (MTF). The effective MTF of a CCD imaging system is dependent upon many parameters of the components of the imaging and signal processing paths. For electronic imaging application, CCD imagers have three inherent MTF performance limiting characteristics: aperture MTF, charge transfer MTF and diffusion MTF. The aperture MTF is a function of the cell design and aperture size and can be calculated easily. The charge transfer MTF is a function of the charge transfer efficiency (CTE) and the number of transfers the image signal will see. The CTE of a device can be both design, process and defect limited. Diffusion MTF is also a function of the cell design and size, but is dependent upon the processing, including starting material, gettering as well as oxide and doping layer thicknesses. The variability of both CTE and diffusion parameters with respect to processing leads one to test for them on a recurring basis, especially in product manufacturing.

CTE is typically measured by the inclusion of a "fill and spill" injection circuit incorporated on one end of the CCD shift register. One such circuit is described in the article of M. F. Tompsett, entitled "Surface Potential Equilibration Method of Setting Charge in Charge Coupled Devices", published in *IEEE Transactions on Electron Devices*, Vol. ED-22, No. 16, June 1975, pg. 305. This method of testing for CTE requires an electrical input pulse applied to an injection diode, and the level of charge metered into the device is determined by the difference between two adjacent electrodes. This testing method requires three interconnects, the generation of a controlled pulse for the diode, and the adjusting of the levels on the electrodes accordingly for the amount of desired injected signal. Any variation in the thresholds of the electrodes from device to device requires re-adjustment of the potential difference in the ratio of the potentials of the electrodes, and perhaps adjustment of the diode pulse level, to recover a signal of similar amplitude. Thus, automated testing in a manufacturing mode can be cumbersome if many devices are to be evaluated.

A testing method which is better suited for manufacturing is described in an article of S. P. Emmons et al., entitled "A Low Noise Input With Reduced Sensitivity to Threshold Voltage", published in *Technical Digest of IEDM*, Washington, D.C., December 1974, pg. 233. This method compensates for the threshold variations in the charge metering gates. The circuit for this test method includes a common electrode for charging and discharging capacitance associated with a floating diffusion. A pair of switches couple the potential of the common electrode to either $V_{sig}$ or $V_{ref}$, while a third switch is coupled with an injection diode and provides for the charging current. While the threshold tolerance of this structure looks attractive, it comes with the added expense of two additional clocked control signals and an additional DC bias. Also, the on-chip circuitry translates into added area for local interconnect and bondpads, as well as additional package pins, all of which require circuit board space.

SUMMARY OF THE INVENTION

The present invention is directed to a CCD imager comprising a line of imaging photodetectors, a CCD shift register extending along the line of imaging photodetectors, an exposure drain region adjacent each of the imaging photodetectors, an exposure control gate between the imaging photodetectors and their respective exposure drains and a test structure. The test structure comprises a plurality of test photodetectors in the line of imaging photodetectors, an exposure drain region adjacent each test photodetector and a test exposure control gate between the test photodetectors and their respective exposure drain regions. The test exposure control gate is separate from the exposure control gate for the imaging photodetectors.

The present invention is also directed to a method of testing a CCD imaging sensor having a line of a plurality of photodetectors. The method comprises exposing the photodetectors to illumination to generate charges therein. Draining from some of the photodetectors the charges generated therein, and reading out the charges from the remaining photodetectors to determine a certain modulation transfer function of the CCD imager.

The invention will be better understood from the following more detailed description taken with the accompanying drawings and claims.

The drawings are not necessarily to scale.

DETAILED DESCRIPTION

Figure 1:
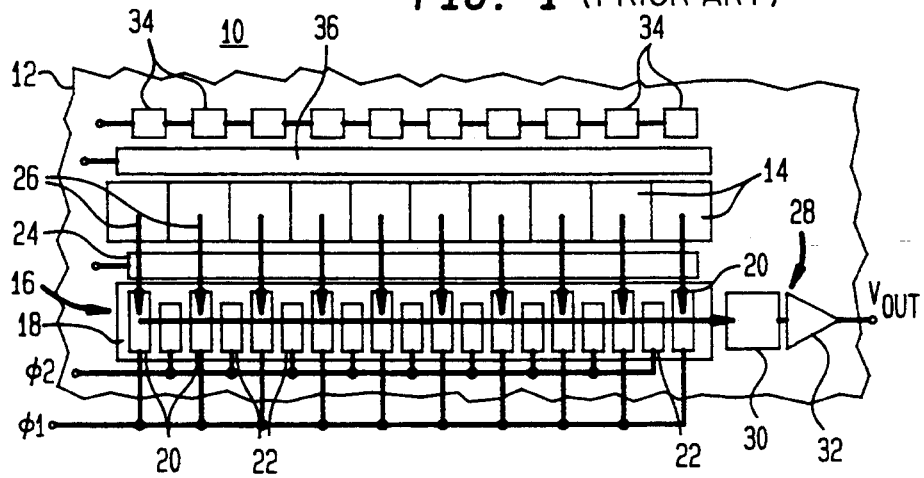
FIG. 1 is a top plane schematic view of a portion of a typical linear CCD imager in which the tester of the present invention can be used.

Referring now to FIG. 1, there is shown a top plane schematic view of a CCD imager 10 in which the test structure of the present invention can be used. CCD imager 10 comprises a body 12 of a semiconductor material having therein a plurality of imaging photodetectors 14. As shown, the imaging photodetectors are arranged in an array of a line for a linear array. However, the photodetectors 14 can be arranged in an array of rows and columns for an area array. Each of the imaging photodetectors 14 can be of any well known type of photodetectors, such as a photodiode or photocapacitor, which receives photons and converts the photons to electrons. Along one side of the line of imaging photodetectors 14 is a CCD shift register 16. CCD shift register 16 comprises a channel region 18 extending along and spaced from the line of photodetectors 14. If the channel region 18 is a buried channel, it is a region of a conductivity type opposite that of the body 12 within the body 12. A plurality of first gate electrodes 20 are over and insulated from the channel region 18. The first gate electrodes 20 are spaced along the channel region with each of the first gate electrodes 20 being adjacent a separate imaging photodetector 14. A plurality of second gate electrodes 22 are over and insulated from the channel region 18. The second gate electrodes 22 are arranged in alternating relation with the first gate electrodes 20 with each of the second gate electrodes 22 being adjacent a separate imaging photodetector 14. Thus, there are two gate electrodes, one first gate electrode 20 and one second gate electrode 22, adjacent each imaging photodetector 14 to form a two-phase CCD shift register 16. The gate electrodes 20 and 22 are of a conductive material, such as conductive polycrystalline silicon, and are insulated from the channel region 18 by a layer of an insulating material (not shown), typically silicon dioxide). The first gate electrodes 20 are all connected to a first clock phase O1 and the second gate electrodes are all connected to a second clock phase O2.

A transfer gate 24 extends over and is insulated from the body 12 between the imaging photodetectors 14 and the channel region 18 of the CCD shift register 16. The transfer gate 24 extends over transfer regions, not shown, which extend between the imaging photodetectors 14 and the channel region 18. A potential applied to the transfer gate 24 causes charge carriers generated in the imaging photodetectors 14 to transfer from the photodetectors 14 to the channel region 18 under each of the first gate electrodes 20 as indicated by the arrows 26. At one end of the shift register 16 is an output circuit 28 which includes an output detector 30 and a buffer amplifier 32. Charge carriers which are transferred into the channel region 18 of the CCD shift register 16 from the imaging photodetectors 14 are transferred along the channel region 18 by alternately clocking the gate electrodes 20 and 22 until the charge carriers are fed into the output circuit 28.

A separate exposure drain region 34 is in the body 12 adjacent to but spaced from the side of each imaging photodetector 14 opposite the CCD shift register 16. The drain regions 34 are regions of a conductivity type opposite that of the body 12 and highly doped to be highly conductive. An exposure control gate 36 extends over and is insulated from the body 12 between the imaging photodetectors 14 and the exposure drain regions 34. A potential is applied to the exposure control gate 36 during a portion of the start of an integration period which lowers the potential barrier height between the imaging photodetectors 14 and the exposure drain regions 34. While the potential is applied, all charge carriers generated in the photodetectors 14 flow into the exposure drain regions 34 where they are carried away. After a desired period, the potential on the exposure control gate 36 is lowered, forming a barrier potential between the imaging photodetectors 14 and the exposure drain regions 34. This allows charge to be collected in the photodetectors 14 for the remainder of the integration period. Hence, the effective exposure time is limited to the duration while the exposure control gate potential is lowered.

Figure 2:
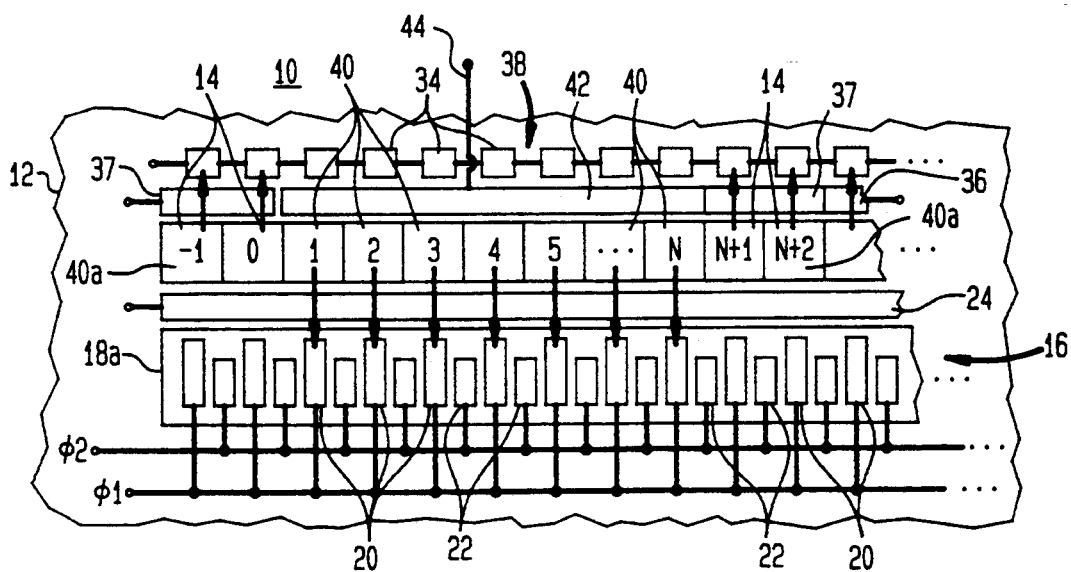
FIG. 2 is a top plane schematic view of a portion of a linear CCD imager incorporating the test structure of the present invention.

Referring now to FIG. 2, there is shown a top plan schematic view of a test structure 38 in accordance with the present invention which can be used in the CCD sensor 10 shown in FIG. 1. The test structure 38 is incorporated in the CCD sensor 10 at a point therealong spaced from the output circuit 28 of the CCD sensor 10 of FIG. 1. The test structure 38 comprises a plurality of test photodetectors 40 which are identical to and extend along the line of imaging photodetectors 14. The number of test photodetectors 40 is N+4. Some of the imaging photodetectors 14 are adjacent to each end of the line of test photodetector 40. The CCD shift register 16 extends along the line of test photodetectors 40 with a pair of the gate electrodes, one of the first gate electrodes 20 and one of the second gate electrodes 22, being adjacent each of the test photodetectors 40. The transfer gate 24 also extends along the line of test photodetectors 40 between the test photodetectors 40 and the channel region 18 of the CCD shift register 16. An exposure drain region 34 is adjacent to but spaced from each of the test photodetectors 40 on the side thereof opposite the CCD shift register 16. The exposure drain regions 34 of the test photodetectors 40 are electrically connected to the exposure drain regions 34 of the photodetectors 14. An exposure control gate 37 extends between each of the edge photodetectors −1, 0 and N+1, N+2 and the exposure drain regions 34. These exposure control gates 37 are either electrically connected to or a continuation of the exposure control gate 36 for the imaging array 10. All test pixels (photodetectors 40) are uncovered except for pixels 40a (−1 and N+2) which are light shielded. Another exposure control gate 42 extends between the center N test photodetectors 40 and their respective exposure drain regions. This test exposure control gate 42 is separate from the exposure control gate 36 and is connected to a separate potential source by a line 44.

Ideally, if one illuminates a group of N+2 photodetectors 40, bounded on either side by a covered, light shielded photodetector 40a, upon readout, a uniform output signal, N+2 pixels in length, would be observed. However, because of the diffusion MTF, each of the photodetectors under illumination has diffusion flux associated with them. This causes loss of some charge from each of the photodetectors to the photodetectors at each side thereof. Since each photodetector, having another photodetector at each side thereof, receives from its adjacent photodetectors as much flux as its losses, the net flux change in any of the illuminated photodetectors is zero, since each of the photodetectors has the same aperture and structure. This is true for all of the photodetectors except for the photodetectors at the ends of the group adjacent to the light shielded photodetectors 40a. For such photodetectors, the next flux is negative since no illuminance is absorbed in the adjacent (light shielded) photodetectors 40a.

Figure 3:
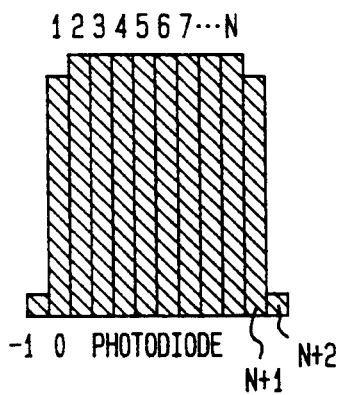
FIG. 3 is a bar graph showing the charge in each of the photodetectors of an array of N+4 photodetectors having only the center N+2 photodetectors uncovered during its operation.

Referring now to FIG. 3, there is shown a bar diagram illustrating the charge in such a case. As can be seen in FIG. 3, the charge in the end photodetectors (photodetectors 0 and N+1) is less than the charge in the N photodetectors therebetween because of the loss of flux. The covered photodetectors (−1 and N+2) next to an open photodetector also accumulate a small amount of the charge, which is the flux loss from the open photodetectors (photodetectors 0 and N+1).

If the CCD imager 10 is illuminated in the normal or "imaging" mode, the potential on the exposure control gate 42 is adjusted to a level such that the charges in the test photodetectors 40 (photodetectors 1 through N) are drained to their exposure drains 34. However, the photodetectors 40 adjacent the ends of the row of test photodetectors 40 (photodetectors 0 and N+1) receive normal illumination and will generate charges thereon dependent on this illumination. However, some of the charges in the photodetectors 40 adjacent the ends of the test photodetectors 40 (photodetectors 0 and N+1) will diffuse into the next adjacent photodetectors 40a (photodetectors −1 and N+2 respectively) as a result of diffusion loss.

Figure 4:
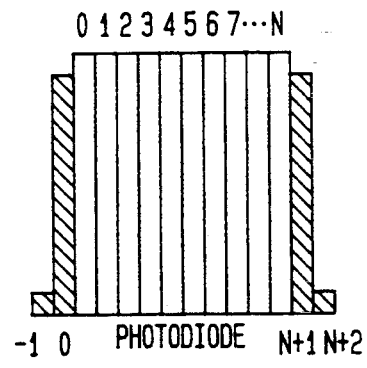
FIG. 4 is a bar graph showing the charge in each of the photodetectors of the test structure during the imaging mode of operation of the test structure.

Referring now to FIG. 4, there is shown a bar graph of the charges in the various photodetectors 40 under these conditions. The graph in FIG. 4 shows that there are no charge in the center test photodetectors 40 (photodetectors 1 to N), whereas the next adjacent photodetectors 40 (photodetectors 0 and N+1) have a full charge less a small amount lost by diffusion and the next photodetectors 40a (photodetectors −1 and N+2) have a small charge equal to the diffused charge. From the charges in the photodetectors 40 adjacent the ends of the test photodetectors 40, the diffusion MTF of the CCD imager 10 can be calculated.

In the test mode, the potential on the exposure control gate 42 of the test structure 38 is lowered to allow for charge collection in the N test photodetectors 40. At the same time, the potential on the exposure control gate 36 is raised to a "high" or "on" level to drain all of the photo-generated charge in the imaging photodetectors 14 to their respective overflow drain regions 34. However, the photodetectors 40 (0 and N+1) adjacent the end test photodetectors 40 are also illuminated and thereby generate diffusion charge therein. Thus, there is a flux flow between the photodetectors 40 (photodetectors 0 and N+1) which are adjacent the end test photodetectors 40 (photodetectors 1 and N). This provides a uniform charge in all of the test photodetectors 40.

Figure 5:
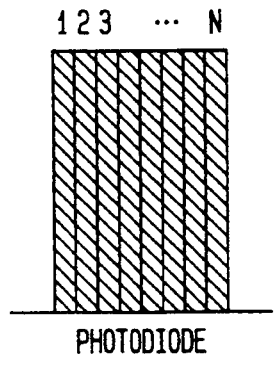
FIG. 5 is a bar graph showing the change in each of the photodetectors of the test structure in the CTE mode of operation of the test structure.

Referring to FIG. 5, there is shown a bar graph illustrating the charge in this case. As can be seen in FIG. 5, the charge in all of the test photodetectors 40 (1−N) are all of uniform intensity.

The transfer gate 24 is then pulsed so that the charge from all of the N test photodetectors 40, which are of uniform level, are transferred to the CCD shift register 16 for clocking to the output circuit 28. At the output circuit 28 measurement of the pulse train response is made. The distortion in the output waveform allows for the extraction of the CTE value in the manner described in the article of R. W. Brodersen et al., entitled "Experimental Characterization of Transfer Efficiency in Charge-Coupled Devices", published in *IEEE Transactions On Electron Devices*, Vol. ED-22, February 1975, pg. 40.

Thus, the test structure 38 permits the determination of either the CTE or the diffusion MTF of the CCD imager 10. The test structure 38 is merely a portion of the CCD imager 10 itself with only addition of the test overflow transfer gate 42 and the input line to the test overflow transfer gate 42. This permits the test structure 38 to be easily included in the CCD imager 10. More importantly, the test structure 38 is activated simply by binary "on" or "off" levels on the control gates and can be illuminated from a uniform source, requiring no special optics hardware or accurate positioning. The level of the test signal is metered by the illumination level or by the duration of the exposure control gates which are held in the "off" or "on" state. The illumination source would typically be the available source used to verify imaging functionality and defect levels as part of a general test schedule for the CCD imager 10. Thus, the test structure 38 can be easily used during the manufacturing of the CCD imager 10 to determine the CTE or diffusion MTF of the CCD imager 10.

It is to be appreciated and understood that the specific embodiments of the invention are merely illustrative of the general principles of the invention. Various modifications may be made consistent with the principles set forth. For example, various type of photodetectors can be used and the test structure can be located anywhere along the row of photodetectors.

What is claimed is:

1. In a CCD image sensor comprising a plurality of photodetectors including imaging photodetectors and test photodetectors, a CCD shift register extending along one side of the photodetectors, an exposure drain region adjacent each photodetector on the other side thereof, opposite the CCD shift register, a first exposure control gate between the imaging photodetectors and the exposure drain region for selectively coupling the imaging photodetectors to the adjacent exposure drain region, a test structure comprising:
   a line of adjacent test photodetectors in line with the imaging photodetectors; and
   a second exposure control gate operable independent of the first exposure control gate for selectively coupling one or more of the test photodetectors to the adjacent exposure drain region,
   wherein the CCD shift register includes a channel region extending along but spaced from the line of imaging photodetectors and test photodetectors and a transfer gate between the photodetectors and the channel region.

2. The test structure of claim 1 in which the test photodetector at each end of the line of test photodetectors is shielded so that it is not illuminated.

3. The CCD imager of claim 2 including a plurality of gate electrodes along the channel region with the gate electrodes extending across and insulated from the channel region, at least one of the gate electrodes being adjacent each of the test and imaging photodetectors.

4. The CCD imager of claim 3 in which there are two gate electrodes adjacent each of the imaging and test photodetectors.

5. The CCD imager of claim 4 further comprising an output circuit at the end of the CCD shift register for receiving and analyzing charges transferred along the channel region from the imaging photodetectors and test photodetectors.

6. A CCD imager comprising:
   a body of semiconductor material;
   a first set of photodetectors in the body, including imaging photodetectors extending along a line;
   a second set of photodetectors in the body, including a line of adjacent test photodetectors in the same line as the first set of photodetectors;
   a CCD shift register extending along the line of imaging photodetectors and test photodetectors;
   an exposure drain region in the body adjacent each photodetector;
   a first exposure control gate for selectively coupling the first set of photodetectors to the adjacent drain region;
   a second exposure control gate for selectively coupling the second set of photodetectors to the adjacent drain region;

wherein the CCD shift register includes a channel region extending along but spaced from the line of imaging photodetectors and test photodetectors and a transfer gate between the photodetectors and the channel region.

7. The CCD imager of claim 6 wherein there is at least one imaging photodetector at each end of the line of test photodetectors.

8. The CCD imager of claim 6 in which the test photodetectors at each end of the line of test photodetectors is shielded so that it is not illuminated.

9. The CCD imager of claim 8 including a plurality of gate electrodes along the channel region with the gate electrodes extending across and insulated from the channel region, at least one of the gates is adjacent each of the test and imaging photodetectors.

10. The CCD imager of claim 9 in which there are two gate electrodes adjacent each imaging photodetector and test photodetector.

11. The CCD imager of claim 10 further comprising an output circuit at the end of the CCD shift register channel region for receiving and analyzing charges transferred along the channel region from the imaging photodetectors and the test photodetectors.

* * * * *